Oct. 28, 1941.    G. J. HENRY    2,260,523
VALVE
Filed Dec. 9, 1938.

INVENTOR.
Guy J. Henry,
BY Cromwell, Greist + Warden
ATTORNEYS

Patented Oct. 28, 1941

2,260,523

UNITED STATES PATENT OFFICE 2,260,523

VALVE

Guy J. Henry, Chicago, Ill.

Application December 9, 1938, Serial No. 244,737

4 Claims. (Cl. 251—22)

This invention has to do with valves, and is particularly concerned with shut-off valves of the type commonly used with refrigeration compressors.

The principal purpose of the invention is to provide an improved shut-off valve which is inexpensive to manufacture, is simple in construction, can be easily re-packed while in service, and will not leak under high pressure even through subjected to rough handling over a long period of time.

While the foregoing statement is indicative in a general way of the nature of the invention, other more specific objects and advantages will be apparent to those skilled in the art upon a full understanding of the construction of the improved valve.

A preferred embodiment of the invention is presented herein for the purpose of exemplification, but it will of course be appreciated that the invention is susceptible of incorporation in other slightly modified structural forms coming equally within the scope of the appended claims.

Figure 1:
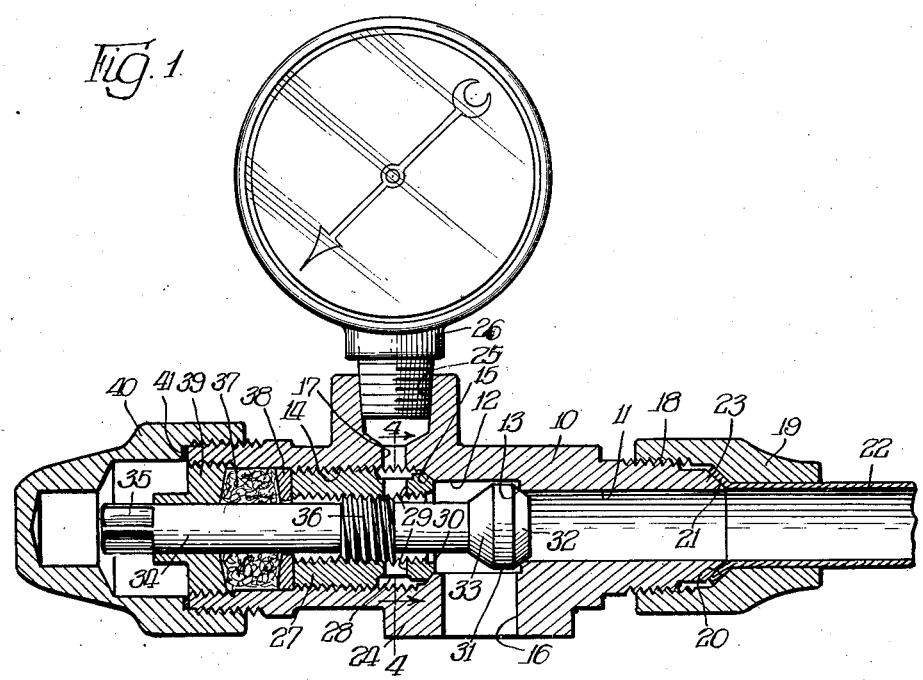
Fig. 1 is a longitudinal diametric section through the valve.
Figure 2:
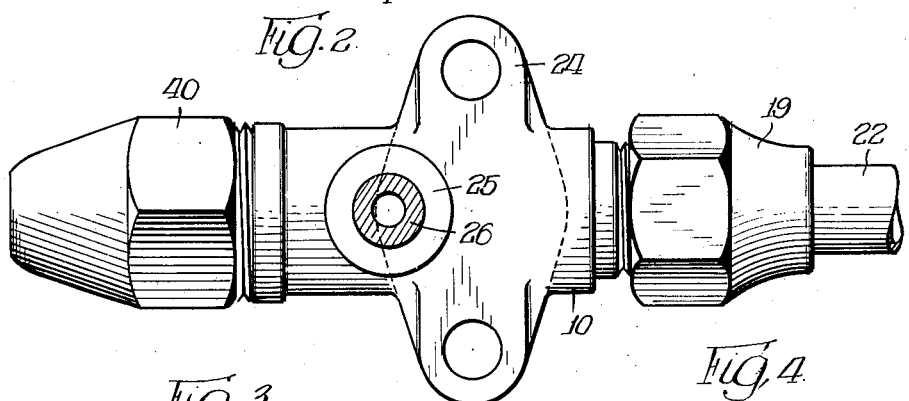
Fig. 2 is a plan view of the valve, with the pressure gauge shown in Fig. 1 removed.
Figure 3:
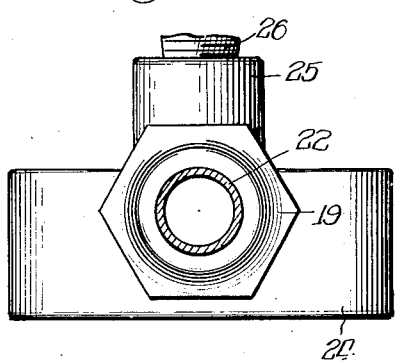
Fig. 3 is an end view of the valve.
Figure 4:
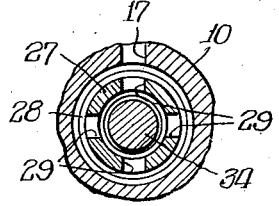
Fig. 4 is a transverse section through the valve, taken on the line 4—4 of Fig. 1.

As will be observed in the drawing, the shut-off valve is characterized by an elongated one-piece body 10 which is bored from one end to the other to provide an inlet bore 11 at one end, an enlarged valve chamber bore 12 beyond the inlet bore 11 in communication with the latter, a shut-off seat 13 at the junction of the bores 11 and 12, a still further enlarged and threaded bushing bore 14 beyond the bore 12 in communication with the latter, and a bushing seat 15 at the junction of the bores 12 and 14. The body 10 is also bored transversely to provide a main outlet 16 from the valve chamber bore 12 and a supplemental outlet 17 from the bushing bore 14.

The end of the body 10 which contains the inlet bore 11 is exteriorly threaded at 18 to receive a coupling nut 19, which nut contains a conical shoulder 20 for clamping the flared end 21 of a copper tube 22 against a correspondingly shaped seat 23 on the end of the body.

The outlet 16 in the side of the body 10 is surrounded by an integrally formed clamping flange 24, which flange is employed in bolting the body to a support containing a passage in register with the outlet 16. The supplemental outlet 17 opens into a screw-threaded socket 25 in which a pressure gauge 26 may be mounted.

A back-seat bushing 27, which is both exteriorly and interiorly threaded, is screwed into the bore 14 in sealed engagement with the seat 15. This bushing is provided with a shallow annular groove 28 in its outer periphery in register with the outlet 17 leading to the pressure gauge, and is provided with a plurality of radially disposed openings 29 in communication with the groove 28. A back seat 30 is formed on the front edge of the bushing 27 at the opposite end of the valve chamber bore 12 from the shut-off seat 13.

A reciprocating valve head 31, having a front conical face 32 and a back conical face 33, is positioned in the valve chamber bore 12, for engagement with the shut-off seat 13 when moved in one direction and engagement with the back seat 30 when moved in the opposite direction. The valve head 31 is mounted on an integral stem 34 which projects from the body 10 through the bore 14 and terminates in a squared wrench-engaging portion 35. The stem 34 is provided intermediate its ends with a short threaded section 36 which is screwed into the bushing 27 at a point behind the openings 29 in the latter. The stem 34 is sealed against leakage by a quantity of packing material 37 which is compressed in the bore 14 behind the bushing 27 between a washer 38 and a screw-threaded gland 39. The section of the bore 14 in which the packing material 37 and washer 38 are located is preferably smooth instead of threaded, and the extremity of the bore 14 beyond the packing 37 is threaded for coaction with the gland 39. At all times except when the stem 34 is being manipulated to either open or close the valve, the exposed end of the stem is covered by a sealing cap 40 which is screwed over the adjacent end of the body against a small sealing gasket 41.

When the stem 34 is turned in one direction as far as it will go the conical face 32 of the valve head 31 will engage tightly against the seat 13 and prevent any more fluid from entering the body through the inlet bore 11. With the valve thus shut off, the pressure of the fluid in the portion of the system into which the outlet 16 opens will act upon the gauge 26 to give a pressure reading, the fluid having free access to the gauge about the front portion of the stem 34 through the openings 29 into the groove 28. When the stem 34 is turned in the opposite direction as far as it will go, the conical face 33 of the valve head will engage tightly against the back seat 30 on the front end of the bushing 27, thereby sealing the valve against leakage back along the stem and at the same time completely cutting off the pressure gauge 26. In this last described condition of the valve the packing 37 can be easily replaced without any need of cutting the valve out of the system. The supplemental outlet 17, instead of being used for the pressure gauge 26, can be connected up with a secondary outlet line for any purpose desired, or can be entirely closed off by means of a screw plug, such changes being easily made without any likelihood of leakage with the valve in its open back-seated position.

While the port 11 has been referred to herein as an "inlet" and the port 16 as an "outlet," it will of course be appreciated that when the flow of fluid through the valve is reversed—as when the valve is used, for instance, on the discharge side of a compressor—the port 11 will become an outlet and the port 16 an inlet. Consequently, the use of these particular terms in the claims is not to be considered as a limitation upon the scope of the invention.

I claim:

1. A shut-off valve, comprising an elongated one-piece body which is bored from one end to the other to provide an inlet bore at one end, an enlarged valve chamber bore beyond the inlet bore in communication with the latter, a shut-off seat at the junction of said bores, a still further enlarged and threaded bushing bore beyond the valve chamber bore in communication with the latter, and a bushing seat at the junction of said last two mentioned bores, said body being also bored transversely to provide a main outlet from the valve chamber bore and a supplemental outlet from the bushing bore; an exteriorly and interiorly threaded back-seat bushing screwed into the bushing bore in sealed engagement with the bushing seat, said bushing having an annular groove in its outer periphery in register with the outlet in the bushing bore and one or more radial openings in communication with the groove, a back seat on the front end of the bushing, a reciprocating valve positioned in the valve chamber bore for engagement in one direction with the shut-off seat and in the opposite direction with the back seat, a stem on the valve having a threaded section screwed into the bushing at a point behind the radial openings in the latter, axially compressed packing means in the bushing bore about the valve stem in axial abutment with the rear end of the bushing.

2. A shut-off valve, comprising an elongated one-piece body which is bored from one end to the other to provide an inlet bore at one end, an enlarged valve chamber bore beyond the inlet bore in communication with the latter, a shut-off seat at the junction of said bores, a still further enlarged and threaded bushing bore beyond the valve chamber bore in communication with the latter, and a bushing seat at the junction of said last two mentioned bores, said body being also bored transversely to provide a main outlet from the valve chamber bore; an exteriorly and interiorly threaded back-seat bushing screwed into the bushing bore in sealed engagement with the bushing seat, a back seat on the front end of the bushing, a reciprocating valve positioned in the valve chamber bore for engagement in one direction with the shut-off seat and in the opposite direction with the back seat, a stem on the valve having a threaded section screwed into the bushing, and axially compressed packing means in the bushing bore about the valve stem in axial abutment with the rear end of the bushing.

3. A shut-off valve, comprising an elongated one-piece body which is bored from one end to the other to provide an inlet bore at one end, an enlarged valve chamber bore beyond the inlet bore in communication with the latter, a shut-off seat at the junction of said bores, a still further enlarged and threaded bushing bore beyond the valve chamber bore in communication with the latter, and a bushing seat at the junction of said last two mentioned bores, said body being also bored transversely to provide a main outlet from the valve chamber bore; an exteriorly and interiorly threaded back-seat bushing screwed into the bushing bore in sealed engagement with the bushing seat, a back seat on the front end of the bushing, a reciprocating valve positioned in the valve chamber bore for engagement in one direction with the shut-off seat and in the opposite direction with the back seat, a stem on the valve having a threaded section screwed into the bushing, axially compressed packing means in the bushing bore about the valve stem in axial abutment with the rear end of the bushing, and a closure cap for the exposed end of the stem screwed over the bushing bore end of the body.

4. A shut-off valve, comprising an elongated body which is bored from one end to the other to provide an inlet bore at one end, an enlarged valve chamber bore beyond the inlet bore in communication with the latter, a shut-off seat at the junction of said bores, a still further enlarged and threaded bushing bore beyond the valve chamber bore in communication with the latter, and a bushing seat at the junction of said last two mentioned bores, said body being also bored transversely to provide a main outlet from the valve chamber bore; an exteriorly and interiorly threaded back-seat bushing screwed into the bushing bore in sealed engagement with the bushing seat, a back seat on the front end of the bushing, a reciprocating valve positioned in the valve chamber bore for engagement in one direction with the shut-off seat and in the opposite direction with the back seat, a stem on the valve having a threaded section screwed into the bushing, and axially compressed packing means in the bushing bore about the valve stem in axial abutment with the rear end of the bushing.

GUY J. HENRY.